June 7, 1960        G. J. KING        2,939,637

LAWN SPRINKLER

Filed July 5, 1956

INVENTOR.
Elizabeth King,
Executrix of the
Estate of George
J. King, Deceased
BY Charles L. Lovercheck
                  Attorney United States Patent Office 2,939,637
Patented June 7, 1960

2,939,637
LAWN SPRINKLER

George J. King, deceased, late of Erie, Pa., by Elizabeth King, executrix, 502 W. 10th St., Erie, Pa.

Filed July 5, 1956, Ser. No. 595,893

2 Claims. (Cl. 239—387)

This invention relates to sprinklers and more particularly to the type of sprinklers known as lawn sprinklers.

Lawn sprinklers which have been made according to previous designs have often been inclined to send the water therefrom in heavy streams and have not been inclined to cause the water to spread uniformly over the ground.

It is, accordingly, an object of this invention to provide a lawn sprinkler which overcomes the above and other defects in present sprinklers and, more particularly, it is an object of this invention to provide a lawn sprinkler which is simple in construction, economical to manufacture, and simple and efficient to use.

Another object of the invention is to provide a lawn sprinkler which will spread the water out in a uniform pattern over a substantial area around the sprinkler.

A further object of the invention is to provide an improved lawn sprinkler.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 3:
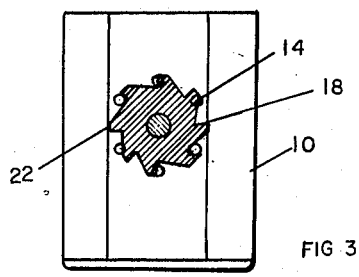
Fig. 3 is a top view taken on line 3—3 of Fig. 2.
Figure 1:
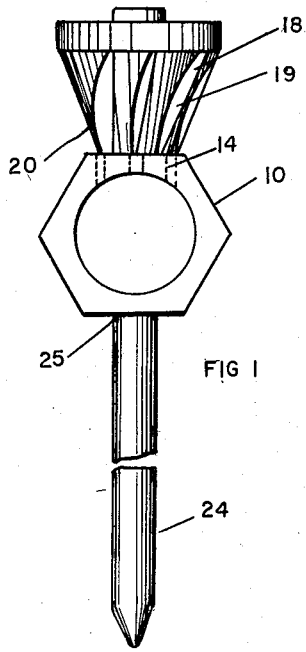
Fig. 1 is an end view of a sprinkler according to the invention.
Figure 2:
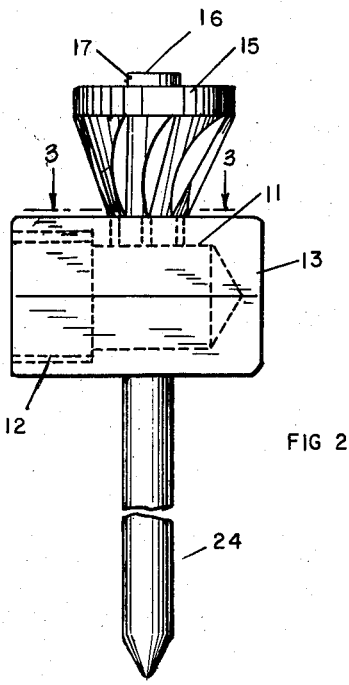
Fig. 2 is a side view of the sprinkler shown in Fig. 1.

Now with more specific reference to the drawing, the sprinkler shown in Figs. 1, 2, and 3 has a body 10 made of hexagonal stock and having a bore 11 therethrough. The bore 11 is counterbored at 12 and threaded to receive the male end of a hose, pipe, or the like. An end 13 is closed and six holes 14 are drilled through the top of the body 10. An impeller 15 having the shape of an inverted frustum of a cone is pivotally mounted on an axle 16 which has a head 17 thereon.

The impeller 15 has eight peripheral spiral shaped grooves 18 cut in the surface thereof. The grooves 18 have a flat surface 19 and curved surfaces 20. These spirals may be cut by utilizing a round milling cutter member and running it on a line which would intersect a circle at points spaced from the diameter thereof. The spirals end at the bottom in the manner shown in Fig. 3 and are so arranged that portions 22 between the grooves 18 will run across the top of the holes 14 in the body 10, thereby further agitating and deflecting the water spray and causing an increased pressure at the holes 14 directly under the slots.

A ground engaging stake 24 is attached to the bottom of the body 10 at 25 for inserting into the ground.

When the embodiment of the invention shown in Figs. 1, 2, and 3 is connected to a hose and water turned on and the ground engaging member 24 inserted into the ground, the water will flow up through the holes 14 and engage the curved surfaces 20 and cause the impeller 15 to rotate, thereby distributing the water over a uniform area.

Figure 4:
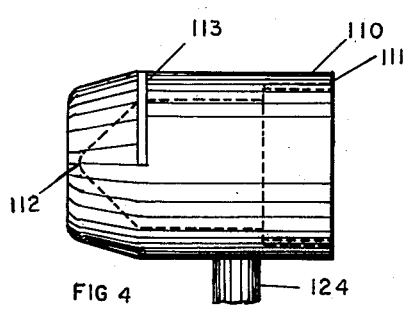
Fig. 4 is a side view of another embodiment of the invention.
Figure 5:
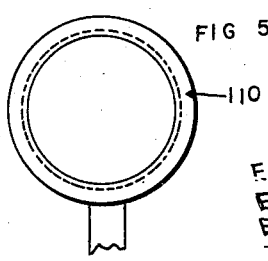
Fig. 5 is an end view of the embodiment of the invention shown in Fig. 4.

In the embodiment of the invention shown in Figs. 4 and 5, a cup shaped closed body member 110 is shown having a threaded counterbore 111 and a closed end 112. A transverse slot 113 is cut in the side of the member 110 perpendicular to the axis thereof and parallel to the diameter thereof. The slot 113 may be formed by cutting half way through the body member 110. Water will, therefore, spray out straight up and straight out of the slot 113. Any slight breeze will tend to distribute the water evenly over the ground. A ground engaging member 124 is provided on the bottom of the member 110 shown in Figs. 4 and 5 similar to the member 24 shown in Figs. 1, 2, and 3.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A sprinkler comprising a hollow body member closed at one end and having means on the other end for ataching to a hose, spaced holes formed in a circular pattern in one side of said body member, and a notched impeller rotatably supported above said body member and contiguous to said holes and rotatable about the center of said circular patern, said impeller having portions disposed over said holes and intermittently partially closing said holes whereby water spraying from said holes is deflected in a uniform pattern.

2. The sprinkler recited in claim 1 wherein said impeller is in the shape of the inverted frustum of a cone having spiral shaped slots cut in the frustum conical surface and disposed in spaced relation with each other.

References Cited in the file of this patent

UNITED STATES PATENTS

| 397,775 | Buick | Feb. 13, 1899 |
| 1,102,748 | Hauer | July 7, 1914 |
| 2,493,595 | Rieger | Jan. 3, 1950 |
| 2,647,014 | Edwards | July 28, 1953 |